US009887651B2

(12) United States Patent
Fu et al.

(10) Patent No.: US 9,887,651 B2
(45) Date of Patent: Feb. 6, 2018

(54) METHOD AND APPARATUS FOR DRIVING MOTOR AND APPLIANCE

(71) Applicant: Guangdong Welling Motor Manufacturing Co., Ltd., Foshan, Guangdong (CN)

(72) Inventors: Yanchao Fu, Guangdong (CN); Zhiqiang Ge, Guangdong (CN); Jie Jie, Guangdong (CN); Xiaoan Zhao, Guangdong (CN); Liming Gong, Guangdong (CN)

(73) Assignee: Guangdong Welling Motor Manufacturing Co., Ltd., Foshan (CN)

( * ) Notice: Subject to any disclaimer, the term of this patent is extended or adjusted under 35 U.S.C. 154(b) by 0 days.

(21) Appl. No.: 15/505,283

(22) PCT Filed: Aug. 21, 2014

(86) PCT No.: PCT/CN2014/084895
§ 371 (c)(1),
(2) Date: Feb. 21, 2017

(87) PCT Pub. No.: WO2016/026114
PCT Pub. Date: Feb. 25, 2016

(65) Prior Publication Data
US 2017/0272010 A1 Sep. 21, 2017

(51) Int. Cl.
*H02P 23/12* (2006.01)
*H02P 6/15* (2016.01)
*H02P 6/08* (2016.01)

(52) U.S. Cl.
CPC . *H02P 6/15* (2016.02); *H02P 6/08* (2013.01)

(58) Field of Classification Search
CPC .... H02P 6/182; H02P 6/16; H02P 6/08; H02P 6/15; H02P 27/06; H02P 9/302
(Continued)

(56) References Cited

U.S. PATENT DOCUMENTS 5,319,291 A * 6/1994 Ramirez .................. H02P 6/30
318/400.13
5,552,682 A * 9/1996 Ushikoshi ................ H02P 6/16
318/400.04
(Continued)

FOREIGN PATENT DOCUMENTS

CN 1728538 A 2/2006
CN 101248399 A 8/2008
(Continued)

OTHER PUBLICATIONS

International Search Report issued by ISA/CN on May 19, 2015 for PCT/CN2014/084895.

*Primary Examiner* — Bentsu Ro
*Assistant Examiner* — Thai Dinh
(74) *Attorney, Agent, or Firm* — Fish & Richardson P.C.

(57) ABSTRACT

A method and apparatus for driving motor and appliance. When a rotor of a motor rotates, a current angle of the rotor is detected at a current moment by using a Hall sensor; a back electromotive force and a phase current of the motor is detected at the current moment; a target torque coefficient is detected by using a relational model for a back electromotive force and a torque coefficient according to the back electromotive force; a current torque coefficient is detected by using a relational model for a phase current and a torque coefficient according to the detected phase current; and a compensation angle is detected according to a rotor angle compensation model and the current angle is compensated by using the compensation angle, to obtain an adjustment angle; and power supply to the motor is adjusted according to the adjustment angle by using a field orientation technology.

11 Claims, 5 Drawing Sheets

(58) Field of Classification Search
USPC .... 318/400.14, 400.15, 400.34, 400.38, 437, 318/459
See application file for complete search history.

(56) References Cited

U.S. PATENT DOCUMENTS

| | | | | | |
|---|---|---|---|---|---|
| 5,677,605 | A | * | 10/1997 | Cambier | H02P 6/181 318/400.02 |
| 5,859,510 | A | * | 1/1999 | Dolan | H02P 6/085 318/400.08 |
| 5,892,339 | A | * | 4/1999 | Park | H02P 6/16 318/400.38 |
| 7,088,067 | B2 | | 8/2006 | Yamamoto et al. | |

FOREIGN PATENT DOCUMENTS

| | | | |
|---|---|---|---|
| CN | 101603997 | A | 12/2009 |
| CN | 101895252 | A | 11/2010 |
| CN | 103414427 | A | 11/2013 |
| JP | 2010161833 | A | 7/2010 |

* cited by examiner

METHOD AND APPARATUS FOR DRIVING MOTOR AND APPLIANCE

TECHNICAL FIELD

The present invention belongs to the motor field, and in particular, relates to a method and apparatus for driving motor and appliance.

BACKGROUND

A permanent magnet synchronous motor has advantages such as high power density and good speed regulating performance, and is widely applied in various electric devices.

Currently, electric devices become necessities of daily life, and power consumption of a great quantity of electric devices grow with each passing day. Motors take up the majority of power energy consumed by electric devices. To reduce power consumption of the motor, currently, an FOC (Field Oriented Control—field oriented control) technology is used to control power supply to the motor.

When the FOC technology is used to control power supply to the motor, a position of a rotor needs to be learned in real time. In the prior art, a position sensor is usually used to detect the position of the rotor. Among numerous position sensors, a Hall sensor is widely applied because the Hall sensor has advantages such as high reliability, low costs, and easy to install.

However, restricted by manufacturing and installation techniques, a Hall sensor inevitably has an installation error during installation. Consequently, there is an error between a rotor position detected by the Hall sensor and an actual rotor position. This error affects precision of controlling the motor by using the FOC technology, causing abnormal phenomena such as a decrease in efficiency of the motor, a start failure, or even a reverse start.

To address an installation error of the Hall sensor, currently, a main compensation means is to manually detect and determine an installation error of the Hall sensor according to a phase relationship between an output signal of the Hall sensor and a back electromotive force of a permanent magnet synchronous motor, and perform compensation on the error. Such a compensation means has low efficiency and high labor costs.

SUMMARY OF THE INVENTION

An objective of the present invention is to provide a method and apparatus for driving motor and appliance, so as to resolve the following problem: an installation error of a Hall sensor is detected manually and error compensation is performed, and consequently, efficiency is low and labor costs are high.

According to a first aspect, the present invention provides a motor driving method, where the motor driving method includes:

when a rotor of a motor rotates, detecting a current angle of the rotor at a current moment by using a Hall sensor, detecting a back electromotive force of the motor at the current moment, and detecting a phase current of the motor at the current moment;

determining a target torque coefficient by using a relational model for a back electromotive force and a torque coefficient according to the back electromotive force;

determining a current torque coefficient by using a relational model for a phase current and a torque coefficient according to the detected phase current;

and determining a compensation angle according to a rotor angle compensation model if a difference between the current torque coefficient and the target torque coefficient is outside a first error range; and compensating the current angle by using the compensation angle, to obtain an adjustment angle;

and adjusting power supply to the motor according to the adjustment angle by using a field orientation technology.

According to a second aspect, the present invention provides a motor driving apparatus, where the motor driving apparatus includes an angle detection module, a back electromotive force detection module, a phase current detection module, and an adjustment module; where the angle detection module is configured to: when a rotor of a motor rotates, detect a current angle of the rotor at a current moment by using a Hall sensor;

the back electromotive force detection module is configured to: when the rotor of the motor rotates, detect a back electromotive force of the motor at the current moment;

the phase current detection module is configured to: when the rotor of the motor rotates, detect a phase current of the motor at the current moment;

the adjustment module comprises a target torque coefficient determining unit, a current torque coefficient determining unit, a compensation angle determining unit, an adjustment angle obtaining unit, and a power supply adjustment unit;

the target torque coefficient determining unit is configured to determine a target torque coefficient by using a relational model for a back electromotive force and a torque coefficient according to the back electromotive force detected by the back electromotive force detection module;

the current torque coefficient determining unit is configured to determine a current torque coefficient by using a relational model for a phase current and a torque coefficient according to the phase current detected by the phase current detection module;

the compensation angle determining unit is configured to determine a compensation angle according to a rotor angle compensation model if a difference between the current torque coefficient and the target torque coefficient is outside a first error range;

the adjustment angle obtaining unit is configured to compensate, by using the compensation angle, the current angle detected by the angle detection module, to obtain an adjustment angle; and the power supply adjustment unit is configured to adjust power supply to the motor according to the adjustment angle by using a field orientation technology. According to a third aspect, the present invention provides a motor-based electric appliance, where the electric appliance includes the foregoing motor driving apparatus and motor.

The present invention has the following beneficial effects: when a motor is powered on to operate and a rotor of the motor rotates, a current angle of the rotor, a back electromotive force of the motor, and a phase current of the motor are detected simultaneously at a current moment; a target torque coefficient is determined according to a relational model for a back electromotive force and a torque coefficient by using the back electromotive force as a parameter; a current torque coefficient is determined according to a relational model for a phase current and a torque coefficient by using the detected phase current as a parameter; and if a difference between the current torque coefficient and the target torque coefficient is outside a first error range, it indicates that an error exists between the current angle and a target angle (a rotor angle detected by a Hall sensor when no error exists in installation of the Hall sensor), a compensation angle needs to be determined according to a rotor angle compensation model, and the current angle is compensated by using the compensation angle, to obtain an adjustment angle, where the adjustment angle is closer to the target angle compared with the current angle; and then power supply to the motor is adjusted by using the adjustment angle as a parameter and using an FOC technology. Therefore, active power required by the motor to drive a same load torque can be reduced, and a phase current required by the motor is correspondingly reduced. In addition, even if the Hall sensor is installed incorrectly, there is no need to manually re-adjust the Hall sensor. Therefore, human and material resources are saved.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention. To describe the technical solutions in the present invention, the following uses specific embodiments for description.

In the embodiments of the present invention, a position of a rotor in a motor is detected and determined by using a Hall sensor. Then, in a process of continuously determining the rotor by using the Hall sensor, a rotational speed of the rotor in a period of time can be determined.

It should be emphasized that, in the embodiments of the present invention, a rotor angle, the parameter used when a field oriented control (Field Oriented Control, FOC) technology is used to control power supply to the motor is detected and determined by using the Hall sensor. In the embodiments of the present invention, FOC control policies that may be used in the FOC technology include but are not limited to: a control policy in which a direct axis current is set to zero, a constant magnetic linkage control policy, a weak magnetic control policy, and the like.

However, for the motor of the Hall sensor, a rotor angle detected by the Hall sensor needs to be used when the FOC technology is used to control power supply to the motor. If an error (for example, when three Hall sensors need to be installed at an interval of 120 degrees, the installation is not implemented at an even interval of 120 degrees) exists in installation of the Hall sensor, precision of controlling power supply to the motor by using the FOC technology is affected.

In view of a possible installation error of the Hall sensor, in the embodiments of the present invention, when the FOC technology is used to control power supply to the motor, a target angle is gradually approached by performing angle compensation on the rotor angle. The target angle is a rotor angle detected by a Hall sensor when no error exists in installation of the Hall sensor. When power supply to the motor is controlled by using the target angle as a parameter and using the FOC technology, active power required by the motor is the smallest.

In a specific implementation manner of the embodiments of the present invention, the motor is implemented by using a permanent magnet synchronous motor.

Figure 1:
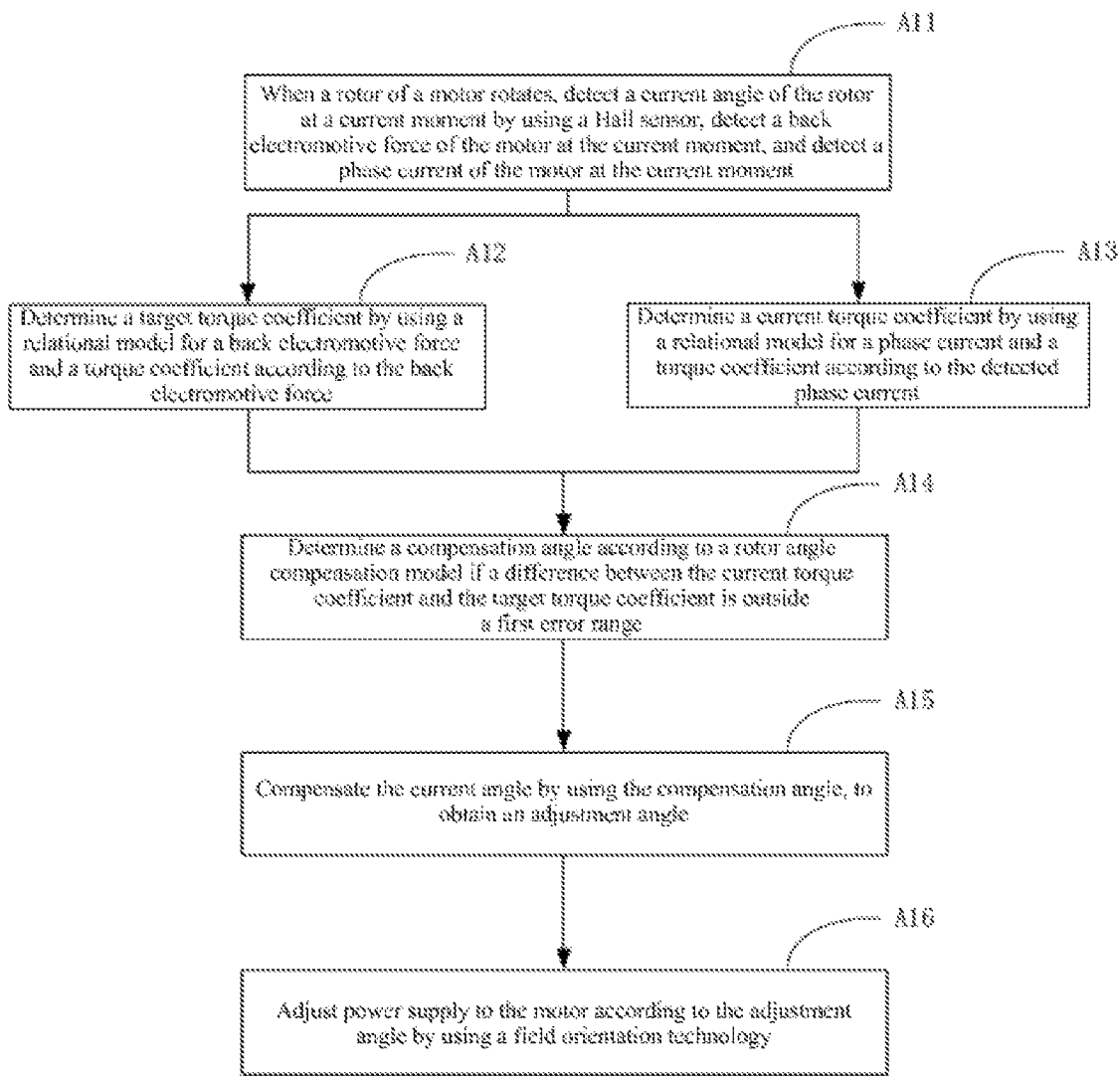
FIG. 1 is a flowchart for implementing a motor driving method according to an embodiment of the present invention.

For a specific method for performing angle compensation on the rotor angle and controlling power supply to the motor by using the FOC technology in this embodiment of the present invention, refer to FIG. 1. FIG. 1 shows a procedure for implementing a motor driving method according to an embodiment of the present invention. For ease of description, only a part related to this embodiment of the present invention is illustrated.

The motor driving method provided in this embodiment of the present invention is shown in FIG. 1. The motor driving method includes step A11, step A12, step A13, step A14, step A15, and step A16.

Step A11. When a rotor of a motor rotates, detect a current angle of the rotor at a current moment by using a Hall sensor, detect a back electromotive force of the motor at the current moment, and detect a phase current of the motor at the current moment.

In this embodiment of the present invention, an FOC technology is used to control power supply to the motor, and when the motor is powered on to operate, the rotor of the motor rotates; the Hall sensor is disposed on the motor, and a position of the rotor is detected by using the Hall sensor.

At a moment, an angle of the rotor at the moment may be determined according to a position of the rotor. For example, at the current moment, an angle of the rotor at the current moment may be determined according to a position of the rotor at the current moment that is detected by the Hall sensor, and the angle is used as the current angle of the rotor.

In a period of time, angles of the rotor at different time points within the period of time may be determined by using the Hall sensor, and then a rotational speed of the rotor within the period of time is calculated according to the angles of the rotor at different time points.

In this embodiment of the present invention, the back electromotive force of the motor is detected when the rotor rotates. A manner used to detect the back electromotive force of the motor is not limited herein.

In this embodiment of the present invention, the phase current of the motor is detected when the rotor rotates. A manner used to detect the phase current of the motor is not limited herein. Preferably, when the phase current of the motor is being detected, a current of any phase of the motor may be detected, and the detected current is used as the phase current of the motor in this embodiment of the present invention.

In this embodiment of the present invention, after the motor is powered on to operate, the rotor of the motor rotates, and step A11 is performed. According to a specific requirement of performing step A11 the detection needs to be performed at the current moment. That is, the current angle of the rotor is detected at the current moment by using the Hall sensor, the back electromotive force of the motor is also detected at the current moment, and the phase current of the motor is also detected the current moment.

Step A12 is performed by using the back electromotive force of the motor that is detected at the current moment. Step A13 is performed by using the phase current of the motor that is detected at the current moment.

Step A12. Determine a target torque coefficient by using a relational model for a back electromotive force and a torque coefficient according to the back electromotive force.

In this embodiment of the present invention, the relational model for a back electromotive force and a torque coefficient is a mathematical model between the back electromotive force of the motor and the torque coefficient of the motor in the motor field. Therefore, in this embodiment of the present invention, no limitation is imposed herein on a specific motor-based mathematical model to which the relational model for a back electromotive force and a torque coefficient belongs.

The relational model for a back electromotive force and a torque coefficient determines a mathematical relationship between the back electromotive force of the motor and the torque coefficient of the motor. Therefore, if the back electromotive force of the motor is detected, the torque coefficient of the motor can be calculated according to the relational model for a back electromotive force and a torque coefficient.

In an implementation manner of this embodiment of the present invention, the motor driving method further includes: when the rotor of the motor rotates, detecting a rotational speed of the rotor at the current moment by using the Hall sensor. In this implementation manner, the rotational speed of the rotor is also detected by using the Hall sensor. In a short period of time that includes the current moment, angles of the rotor at different time points within the short period of time may be determined by using the Hall sensor, then a rotational speed of the rotor within the short period of time is calculated according to the angles of the rotor at the different time points, and the calculated rotational speed is used as the rotational speed of the rotor at the current moment.

Correspondingly, for step A12 the step of determining a target torque coefficient by using a relational model for a back electromotive force and a torque coefficient according to the back electromotive force is specifically:

determining the target torque coefficient according to the back electromotive force and the rotational speed by using a first torque coefficient model; where the first torque coefficient model is as follows:

$$K_T = \frac{3}{2} \times \frac{E}{n} \times \frac{60}{2\pi}, \quad (1)$$

$K_T$ is the target torque coefficient, E is a peak value of the back electromotive force, and n is the rotational speed of the rotor.

In this embodiment, the back electromotive force of the motor is detected at the current moment, and the rotational speed of the rotor is also detected at the current moment. A back electromotive force coefficient $K_e$ at the current moment is determined by using a back electromotive force coefficient model according to the peak value of the back electromotive force and the rotational speed at the current moment. The back electromotive force coefficient model is as follows:

$$K_e = \frac{E}{n}, \quad (2)$$

E is the peak value of the back electromotive force, and n is the rotational speed of the rotor.

Then, a torque coefficient is calculated according to the relational model for a back electromotive force coefficient and a torque coefficient of the motor. The relational model for a back electromotive force coefficient and a torque coefficient of the motor is as follows:

$$K_T = \frac{3}{2} \times K_e \times \frac{60}{2\pi}, \quad (3)$$

In this way, after the back electromotive force coefficient $K_e$ at the current moment is determined, the torque coefficient of the motor at the current moment may be determined according to formula (3).

That is, in this implementation manner, the first torque coefficient model shown in formula (1) is obtained with reference to the back electromotive force coefficient model and the back electromotive force coefficient that are shown in formula (2) and the relational model for a torque coefficient of the motor that is shown in formula (3), and after the peak value of the back electromotive force E is determined and the rotational speed n of the rotor at the current moment is detected, the target torque coefficient $K_T$ at the current moment may be calculated according to the first torque coefficient model (1).

Step A13. Determine a current torque coefficient by using a relational model for a phase current and a torque coefficient according to the detected phase current.

In this embodiment of the present invention, the relational model for a phase current and a torque coefficient is a mathematical model between the phase current of the motor and the torque coefficient of the motor in the motor field. Therefore, in this embodiment of the present invention, no limitation is imposed herein on a specific motor-based mathematical model to which the relational model for a phase current and a torque coefficient belongs.

After the phase current of the motor is detected at the current moment, step A13 is performed to calculate a torque coefficient of the motor at the current moment by using the relational model for a phase current and a torque coefficient, and the calculated torque coefficient is used as the current torque coefficient.

In an implementation manner of this embodiment of the present invention, the relational model for a phase current and a torque coefficient is as follows:

$$K'_T = \frac{T}{I}, \quad (4)$$

K'$_T$ is the current torque coefficient, T is a preloaded load torque, and I is a peak value of the phase current of the motor.

In this implementation manner, the load torque T at the current time may be detected, for example, detected by using a load torque observer of the motor.

In this implementation manner, because the load torque T has been detected in advance, after the phase current of the motor at the current moment is detected, the current torque coefficient K'$_T$ at the current moment is calculated by using the relational model for a phase current and a torque coefficient shown in formula (4) and taking the peak value of the phase current.

Step A14. Determine a compensation angle according to a rotor angle compensation model if a difference between the current torque coefficient and the target torque coefficient is outside a first error range.

In this embodiment of the present invention, the first error range is predetermined. A specific method for determining the first error range is not limited herein and may be set manually or determined according to experimental data. Because the current torque coefficient cannot always be equal to the target torque coefficient, this embodiment of the present invention specifies the following definition: If the difference between the current torque coefficient and the target torque coefficient is within the first error range, the current torque coefficient is considered approximately equal to the target torque coefficient.

Therefore, if the difference between the current torque coefficient and the target torque coefficient is outside the first error range, the current torque coefficient cannot be considered approximately equal to the target torque coefficient, and it is determined that an error exists between the current torque coefficient and the target torque coefficient.

At the target angle (a rotor angle detected by a Hall sensor when no error exists in installation of the Hall sensor), that is, when the current torque coefficient is equal to the target torque coefficient, active power required by the motor to cope with a same load torque is the smallest. Therefore, when an FOC technology is used to control power supply to the motor, the current angle of the rotor needs to be compensated, so that the adjustment angle obtained after the compensation gradually approaches or becomes close to the target angle. In this case, for a same load torque, active power required by the motor is the smallest, that is, the phase current required by the motor is also the smallest.

In this embodiment of the present invention, the compensation angle is determined according to the rotor angle compensation model if the difference between the current torque coefficient and the target torque coefficient is outside the first error range. The rotor angle compensation model used to determine the compensation angle is not limited in this embodiment of the present invention, provided that the following condition is met. The condition is: Relative to the current angle, an adjustment angle obtained by compensating the current angle by using a compensation angle gradually approaches or becomes close to the target angle, where the compensation angle is determined according to the rotor angle compensation model.

Figure 2:
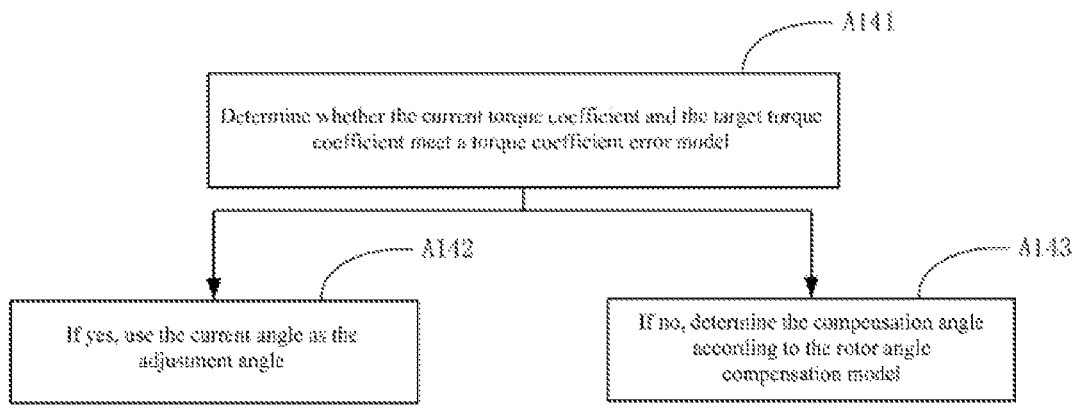
FIG. 2 is a flowchart for implementing step A14 in FIG. 1.

FIG. 2 shows a procedure for implementing step A14. For ease of description, only a part related to this embodiment of the present invention is illustrated.

For an implementation manner of this embodiment of the present invention, refer to FIG. 2. In step A14, the step of determining a compensation angle according to a rotor angle compensation model if a difference between the current torque coefficient and the target torque coefficient is outside a first error range includes step A141, step A142, and step A143.

Step A141. Determine whether the current torque coefficient and the target torque coefficient meet a torque coefficient error model. The torque coefficient error model is as follows:

$$\left| \frac{K'_T - K_T}{K_T} \right| \leq \varepsilon, \quad (5)$$

$\varepsilon$ is determined according to the first error range. In this implementation manner, when the first error range is determined, $\varepsilon$ determined according to the first error range includes all values that meet a condition that the difference between the current torque coefficient and the target torque coefficient is within the first error range.

Preferably, a value of $\varepsilon$ is 5%.

Step A142. If the current torque coefficient and the target torque coefficient meet the torque coefficient error model, use the current angle as the adjustment angle.

In this implementation manner, if the current torque coefficient at the current moment and the target torque coefficient at the current moment meet the torque coefficient error model shown in formula (5), it is determined that:

An installation error of the Hall sensor is relatively small, the current angle has been approaching or close to the target angle, and it may be determined that the current torque coefficient is approximately equal to the target torque coefficient; or if a previous adjustment angle has been obtained with reference to a previous compensation angle (a compensation angle determined at a moment earlier than the current moment), and after power supply to the motor is adjusted by using an FOC technology according to the previous adjustment angle, for the target torque coefficient and the current torque coefficient that is determined at the current moment, if the current torque coefficient and the target torque coefficient meet formula (5), it is considered that the current angle has been approaching or close to the target angle, and it may be determined that the current torque coefficient is approximately equal to the target torque coefficient.

In this implementation manner, when the current torque coefficient at the current moment and the target torque coefficient at the current moment meet the torque coefficient error model shown in formula (5), there is no need to continue to perform angle compensation on the current angle, that is, there is no need to determine a compensation angle according to the rotor angle compensation model, and the current angle is directly used as the adjustment angle at the current moment.

Step A143. If the current torque coefficient and the target torque coefficient do not meet the torque coefficient error model, determine the compensation angle according to the rotor angle compensation model.

In this implementation manner, if the current torque coefficient at the current moment and the target torque coefficient at the current moment do not meet the torque coefficient error model shown in formula (5), it is determined that:

an error still exists between the current angle and the target angle and there is a need to continue to determine the compensation angle and perform angle compensation on the current angle by using the compensation angle, so that a torque coefficient determined at a next time and the target torque coefficient meet formula (5) after power supply to the motor is adjusted by using the FOC technology according to the adjustment angle (obtained by calculating the current angle with reference to the compensation angle), or a torque coefficient determined at a next time and the target torque coefficient still do not meet formula (5), but the torque coefficient determined at the next time becomes close or approaches to the target torque coefficient (that is, the angle detected at the next time approaches or becomes close to the target angle).

Figure 3:
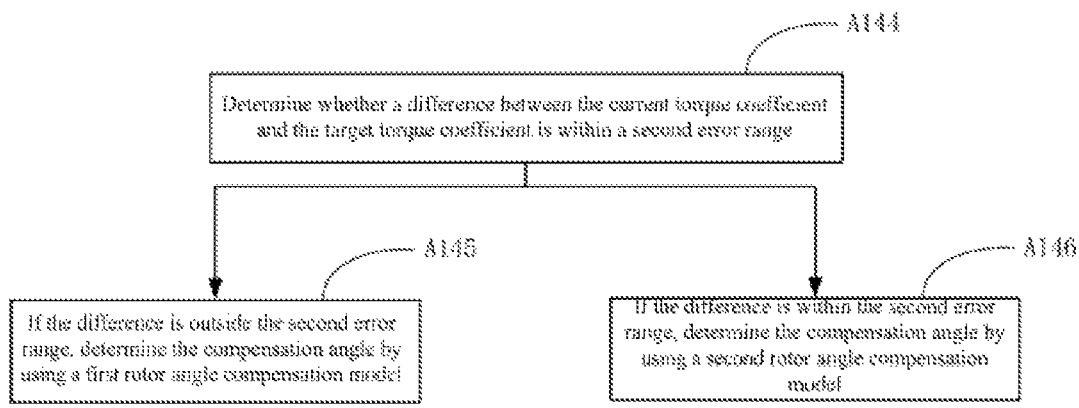
FIG. 3 is another flowchart for implementing step A14 in FIG. 1.

FIG. 3 shows another procedure for implementing step A14. For ease of description, only a part related to this embodiment of the present invention is illustrated.

For a specific implementation manner of this embodiment of the present invention, refer to FIG. 3. For step A14, the step of determining a compensation angle according to a rotor angle compensation model specifically includes step A144, step A145, and step A146.

Step A144. Determine whether a difference between the current torque coefficient and the target torque coefficient is within a second error range.

In this embodiment, not only the first error range is determined, but also the second error range is determined. The second error range includes the first error range.

Because it has been determined when step A14 is performed that the difference between the current torque coefficient and the target torque coefficient is outside the first error range, the compensation angle needs to be determined according to the rotor angle compensation model. Therefore, in this implementation manner, step A144 is further performed to determine whether the difference is within a larger error range, that is, determine whether the difference between the current torque coefficient and the target torque coefficient is within the second error range.

If the difference between the current torque coefficient and the target torque coefficient is outside the second error range, step A145 is performed to determine the compensation angle. An angle value of the compensation angle determined in step A145 is relatively large. Compensation for a larger angle is performed according to the relatively large compensation angle determined in step A145, so that the adjustment angle obtained with reference to the current angle and the compensation angle that is determined in step A145 gradually and rapidly becomes close or approaches to the target angle by a large angle.

If the difference between the current torque coefficient and the target torque coefficient is within the second error range but is outside the first error range, step A146 is performed to determine the compensation angle. An angle value of the compensation angle determined in step A146 is small. Compensation for a smaller angle is performed according to the relatively small compensation angle determined in step A146, so that the adjustment angle obtained with reference to the current angle and the compensation angle that is determined in step A146 gradually becomes close or approaches to the target angle by a small angle.

Step A145. If the difference is outside the second error range, determine the compensation angle $\theta_i$ by using a first rotor angle compensation model, where the first rotor angle compensation model is as follows:

$$\theta_i = 2^i \times \Delta \qquad (6),$$

$\theta_i$ is an angle for the $i^{th}$ compensation, i is greater than 1, and $\Delta$ is a unit angle.

In this implementation manner, the unit angle $\Delta$ is preset manually or determined according to experimental data.

In this implementation manner, if the difference between the current torque coefficient at the current moment and the target torque coefficient at the current moment is outside the second error range, angle compensation is performed on the current angle detected at the current moment. The angle compensation performed on the current angle detected at the current moment is the angle for the $i^{th}$ compensation.

Because the angle for the $i^{th}$ compensation is twice the angle for the $(i-1)^{th}$ compensation, the angle of the rotor rapidly becomes close or approaches to the target angle by a large angle.

Step A146. If the difference is within the second error range, determine the compensation angle $\theta_i$ by using a second rotor angle compensation model, where the second rotor angle compensation model is as follows:

$$\theta_i = 1/2 \times (|\theta_{i-1} - \theta_{i-2}|) \qquad (7),$$

$\theta_i$ is an angle for the $i^{th}$ compensation, $\theta_{i-1}$ is an angle for the $(i-1)^{th}$ compensation, and $\theta_{i-2}$ is an angle for the $(i-2)^{th}$ compensation.

In this implementation manner, if the difference between the current torque coefficient at the current moment and the target torque coefficient at the current moment is within the second error range but is outside the first error range, angle compensation is performed on the current angle detected at the current moment. The angle compensation performed on the current angle detected at the current moment is the angle for the $i^{th}$ compensation.

In this implementation manner, if the difference between the current torque coefficient at the current moment and the target torque coefficient at the current moment is within the second error range but is outside the first error range, the compensation angle is gradually narrowed. For example, at the current time, the compensation angle $\theta_i$ is determined at the current time, and the compensation angle $\theta_i$ is half of an absolute value of a difference between an angle $\theta_{i-2}$ for the $(i-1)^{th}$ compensation and an angle $\theta_{i-2}$ for the $(i-2)^{th}$ compensation. In this way, the compensation angle is gradually narrowed, so that the angle of the rotor gradually approaches to the target angle by a small angle. Then, active power required by the motor approaches to active power that is required when an FOC technology is used at the target angle, and the phase current of the motor approaches to a phase current that is detected when the FOC technology is used at the target angle.

In an implementation manner of this embodiment of the present invention, with reference to FIG. 2 and FIG. 3, step A141 is performed to determine whether the current torque coefficient and the target torque coefficient meet a torque coefficient error model, and if the current torque coefficient and the target torque coefficient meet the torque coefficient error model, step A142 is performed, or if the current torque coefficient and the target torque coefficient do not meet the torque coefficient error model, step A144 is performed.

It is determined whether a difference between the current torque coefficient and the target torque coefficient is within a second error range when step A144 is performed. If the difference is outside the second error range, the compensation angle $\theta_i$ is determined by using a first rotor angle compensation model; or if the difference is within the second error range but is outside the first error range, the compensation angle $\theta_i$ is determined by using a second rotor angle compensation model.

In an implementation case of this implementation manner, generally, the difference between the current torque coefficient and the target torque coefficient is outside the second error range at the beginning, and step A145 is performed to determine a relatively large compensation angle, to compensate the angle of the rotor by using the relatively large compensation angle, so that the angle of the rotor rapidly becomes close or approaches to the target angle, active power required by the motor is greatly reduced, and a phase current of the motor is also greatly reduced. After the angle of the rotor rapidly becomes close or approaches to the target angle by using a relatively large compensation angle once or for multiple times, the difference between the current torque coefficient and the target torque coefficient is within the second error range but is outside the first error range, and step A146 is performed to determine a relatively small compensation angle, to compensate the angle of the rotor by using the relatively small compensation angle, so that the angle of the rotor becomes close or approaches to the target angle by a small angle, the active power required by the motor is slightly reduced, and the phase current of the motor is also slightly reduced. After the angle of the rotor becomes close or approaches to the target angle by a small angle by using a relatively small compensation angle once or for multiple times, active power required by the motor approaches to active power that is required when an FOC technology is used at the target angle, and the phase current of the motor approaches to a phase current that is detected when the FOC technology is used at the target angle.

Step A15. Compensate the current angle by using the compensation angle, to obtain an adjustment angle.

In this embodiment of the present invention, the adjustment angle is determined when the following condition is met. The condition is: A phase current that is detected when power supply to the motor is adjusted by using the FOC technology at the current angle is less than or equal to a phase current that is detected when power supply to the motor is adjusted by using the FOC technology at the adjustment angle.

In a specific implementation manner of this embodiment of the present invention, when a sum of the current angle and the compensation angle is used as the adjustment angle, if the adjustment angle meets the condition, the sum of the current angle and the compensation angle is used as the adjustment angle. On the contrary, when a difference obtained by subtracting the compensation angle from the current angle is used as the adjustment angle, if the adjustment angle meets the condition, the difference obtained by subtracting the compensation angle from the current angle is used as the adjustment angle.

In a specific implementation manner of this embodiment of the present invention, when a sum of the current angle and the compensation angle is used as the adjustment angle, if a peak value of a phase current (the phase current detected at the current moment) detected this time is less than or equal to a peak value of a phase current (a phase current detected at a moment later than the current moment) detected at a next time, the sum of the current angle and the compensation angle is used as the adjustment angle. On the contrary, if a peak value of a phase current detected this time is greater than a peak value of a phase current detected at a next time, a difference obtained by subtracting the compensation angle from the current angle is used as the adjustment angle.

In still another specific implementation manner of this embodiment of the present invention, when a difference obtained by subtracting the compensation angle from the current angle is used as the adjustment angle, if a peak value of a phase current (the phase current detected at the current moment) detected this time is less than or equal to a peak value of a phase current (a phase current detected at a moment later than the current moment) detected at a next time, the difference obtained by subtracting the compensation angle from the current angle is used as the adjustment angle. On the contrary, if a peak value of a phase current detected this time is greater than a peak value of a phase current detected at a next time, a sum of the current angle and the compensation angle is used as the adjustment angle.

Step A16. Adjust power supply to the motor according to the adjustment angle by using a field orientation technology.

In this embodiment of the present invention, after the adjustment angle at the current moment is determined, a power supply current that supplies power to the motor is adjusted to a direct axis current and a quadrature axis current according to the adjustment angle, and the power supply to the motor is adjusted according to the direct axis current and the quadrature axis current by using the field orientation technology.

In a specific implementation manner of step A16, a power supply current of a three-phase motor is adjusted to a direct axis current and a quadrature axis current by using a coordinate transformation model. The coordinate transformation model is as follows:

$$\begin{bmatrix} I_u \\ I_v \\ I_w \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} I_d \\ I_q \end{bmatrix}, \quad (8)$$

$I_u$, $I_v$, and $I_w$ are power supply currents in three phases of the three-phase motor, $\theta$ is the adjustment angle, $I_d$ is the direct axis current of the motor, $I_q$ is the quadrature axis current of the motor, and the adjustment angle $\theta$ is an angle obtained after the current angle is compensated by using the compensation angle.

Then, the power supply to the motor is adjusted according to the direct axis current $I_d$ of the motor and the quadrature axis current $I_q$ of the motor by using the field orientation technology.

A person of ordinary skill in the art may further understand that all or some of the steps of the method in the foregoing embodiment may be implemented by a program instructing relevant hardware. The program may be stored in a computer readable storage medium. The storage medium includes a ROM/RAM, a magnetic disk, an optical disc, or the like.

Figure 4:
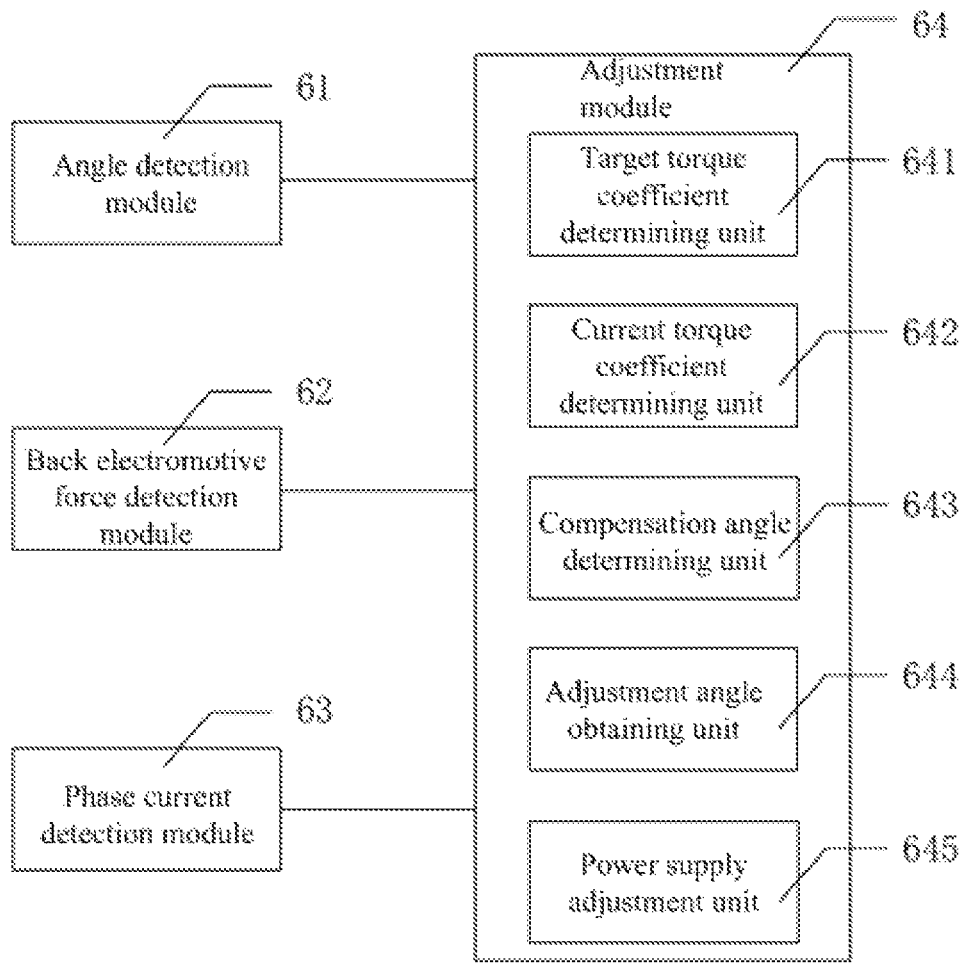
FIG. 4 is a diagram of a composition structure of a motor driving apparatus according to an embodiment of the present invention.

It should be noted that the motor driving method provided in the embodiments of the present invention and a motor driving apparatus provided in the embodiments of the present invention are mutually applicable. FIG. 4 shows a composition structure of a motor driving apparatus according to an embodiment of the present invention. For ease of description, only a part related to this embodiment of the present invention is illustrated.

For a motor driving apparatus provided in this embodiment of the present invention, refer to FIG. 4. The motor driving apparatus includes an angle detection module 61, a back electromotive force detection module 62, a phase current detection module 63, and an adjustment module 64.

For the angle detection module 61 included in the motor driving apparatus, the angle detection module 61 is configured to: when a rotor of a motor rotates, detect a current angle of the rotor at a current moment by using a Hall sensor.

In this embodiment of the present invention, the angle detection module 61 includes the Hall sensor. The Hall sensor is used to detect a position of the rotor. Then, the angle detection module 61 may determine the current angle of the rotor according to a rotor position detected at the current moment.

For the back electromotive force detection module 62 included in the motor driving apparatus, the back electromotive force detection module 62 is configured to: when the rotor of the motor rotates, detect a back electromotive force of the motor at the current moment.

In this embodiment of the present invention, when the rotor of the motor rotates, the back electromotive force of the motor is detected by using the back electromotive force detection module 62. In this embodiment of the present invention, no limitation is imposed on the back electromotive force detection module 62, and no limitation is imposed on an internal circuit, an included component, and an internal structure of the back electromotive force detection module 62, provided that the back electromotive force of the motor can be detected, for example, a detector provided in the prior art is used.

For the phase current detection module 63 included in the motor driving apparatus, the phase current detection module 63 is configured to: when the rotor of the motor rotates, detect a phase current of the motor at the current moment.

In this embodiment of the present invention, no limitation is imposed on the phase current detection module 63, and no limitation is imposed on an internal circuit, an included component, and an internal structure of the phase current detection module 63, provided that the phase current of the motor can be detected. It should be noted that, when the phase current of the motor is being detected, a current of any phase of the motor may be detected, and the detected current is used as the phase current of the motor.

The adjustment module 64 includes a target torque coefficient determining unit 641, a current torque coefficient determining unit 642, a compensation angle determining unit 643, an adjustment angle obtaining unit 644, and a power supply adjustment unit 645.

The target torque coefficient determining unit 641 is configured to determine a target torque coefficient by using a relational model for a back electromotive force and a torque coefficient according to the back electromotive force detected by the back electromotive force detection module 62.

The current torque coefficient determining unit 642 is configured to determine a current torque coefficient by using a relational model for a phase current and a torque coefficient according to the phase current detected by the phase current detection module 63.

The compensation angle determining unit 643 is configured to determine a compensation angle according to a rotor angle compensation model if a difference between the current torque coefficient and the target torque coefficient is outside a first error range.

The adjustment angle obtaining unit 644 is configured to compensate, by using the compensation angle, the current angle detected by the angle detection module 61, to obtain an adjustment angle.

The power supply adjustment unit 645 is configured to adjust power supply to the motor according to the adjustment angle by using a field orientation technology.

In an implementation manner of this embodiment of the present invention, the adjustment module 64 uses components that have a processor function and a storage function, such as a single chip microcomputer, a programmable logic device (for example, a complex programmable logic device (Complex Programmable Logic Device, CPLD) or a field-programmable gate array (Field-Programmable Gate Array, FPGA)), or an ARM processor.

Figure 5:
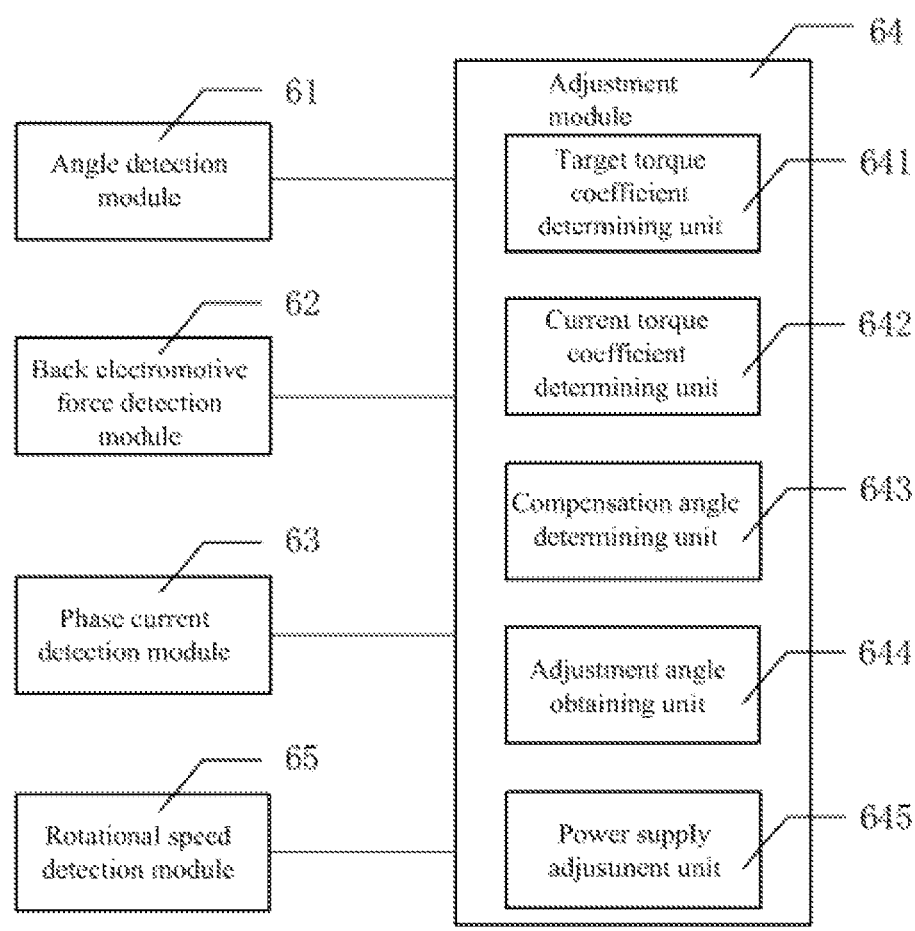
FIG. 5 is a diagram of an optimized composition structure of a motor driving apparatus according to an embodiment of the present invention.

FIG. 5 shows an optimized composition structure of a motor driving apparatus according to an embodiment of the present invention. For ease of description, only a part related to this embodiment of the present invention is illustrated.

For a specific implementation manner of this embodiment of the present invention, refer to FIG. 5. The motor driving apparatus includes a rotational speed detection module 65. In this embodiment of the present invention, the rotational speed detection module 65 includes the Hall sensor. The Hall sensor is used to detect a position of a rotor. Then, the rotational speed detection module 65 may determine a rotational speed of the rotor according to a rotor position change detected within a period of time. Preferably, the rotational speed detection module 65 and the angle detection module 61 are implemented by using a same module.

The rotational speed detection module 65 is configured to: when the rotor of the motor rotates, detect a rotational speed of the rotor at the current moment by using the Hall sensor.

The target torque coefficient determining unit 641 is specifically configured to determine the target torque coefficient by using a first torque coefficient model according to the back electromotive force detected by the back electromotive force detection module 62 and the rotational speed detected by the rotational speed detection module 65.

The first torque coefficient model is $$K_T = \frac{3}{2} \times \frac{E}{n} \times \frac{60}{2\pi},$$

where $K_T$ is the target torque coefficient, E is a peak value of the back electromotive force, and n is the rotational speed of the rotor.

In a specific implementation manner of this embodiment of the present invention, the relational model for a phase current and a torque coefficient is $$K'_T = \frac{T}{I},$$

$K'_T$ is the current torque coefficient, T is a predetected or calculated load torque, and I is a peak value of the phase current of the motor.

Figure 6:
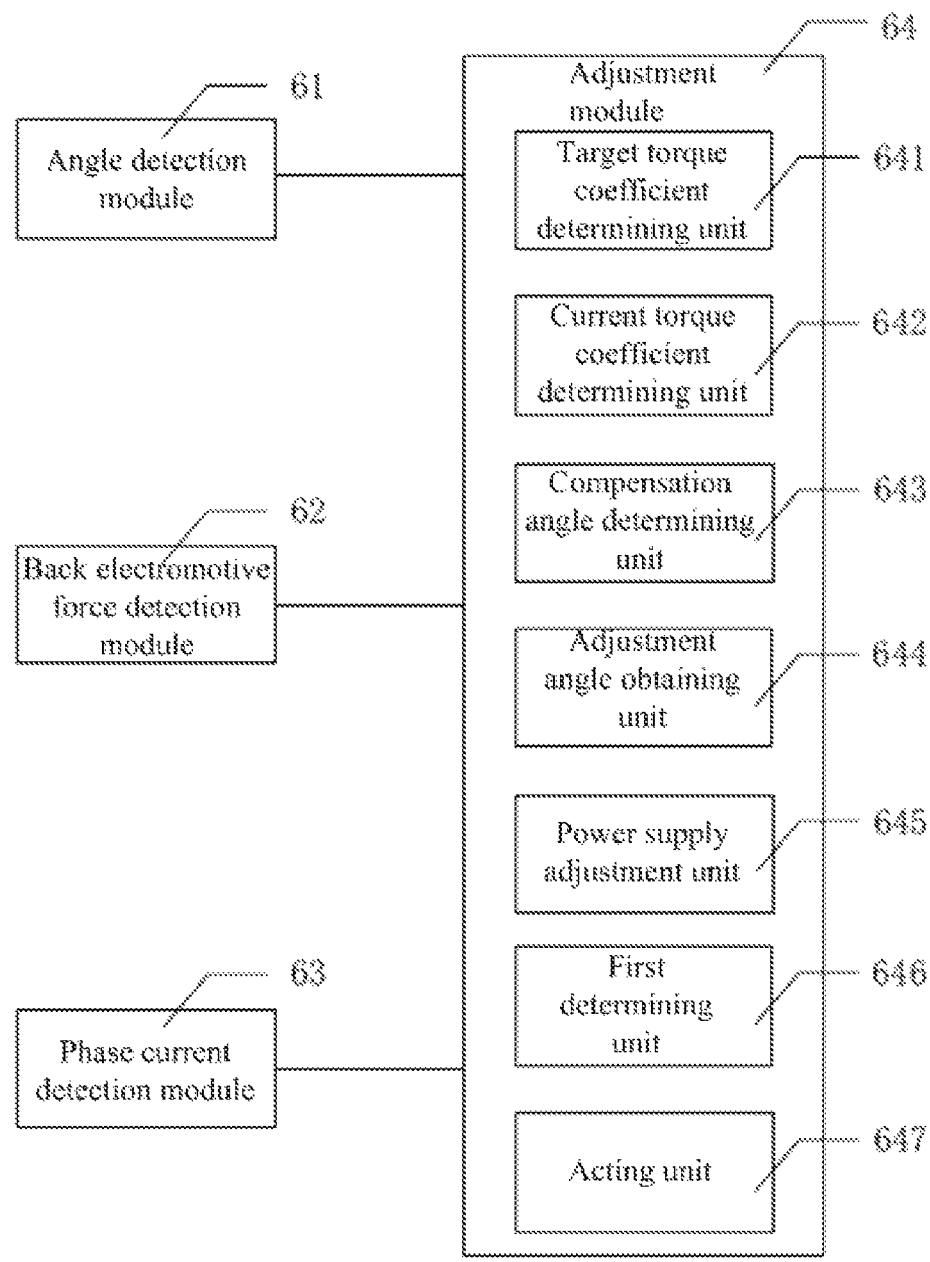
FIG. 6 is a diagram of another optimized composition structure of a motor driving apparatus according to an embodiment of the present invention.

FIG. 6 shows another optimized composition structure of a motor driving apparatus according to an embodiment of the present invention. For ease of description, only a part related to this embodiment of the present invention is illustrated.

For a specific implementation manner of this embodiment of the present invention, refer to FIG. 6. The adjustment module 64 further includes a first determining unit 646 and an acting unit 647.

The first determining unit 646 is configured to determine whether the current torque coefficient and the target torque coefficient meet a torque coefficient error model, where the torque coefficient error model is $$\left| \frac{K'_T - K_T}{K_T} \right| \leq \varepsilon,$$

and $\varepsilon$ is determined according to the first error range.

The acting unit 647 is configured to: if the current torque coefficient and the target torque coefficient meet the torque coefficient error model, use the current angle as the adjustment angle.

The compensation angle determining unit 643 is specifically configured to: if the current torque coefficient and the target torque coefficient do not meet the torque coefficient error model, determine the compensation angle according to the rotor angle compensation model.

Figure 7:
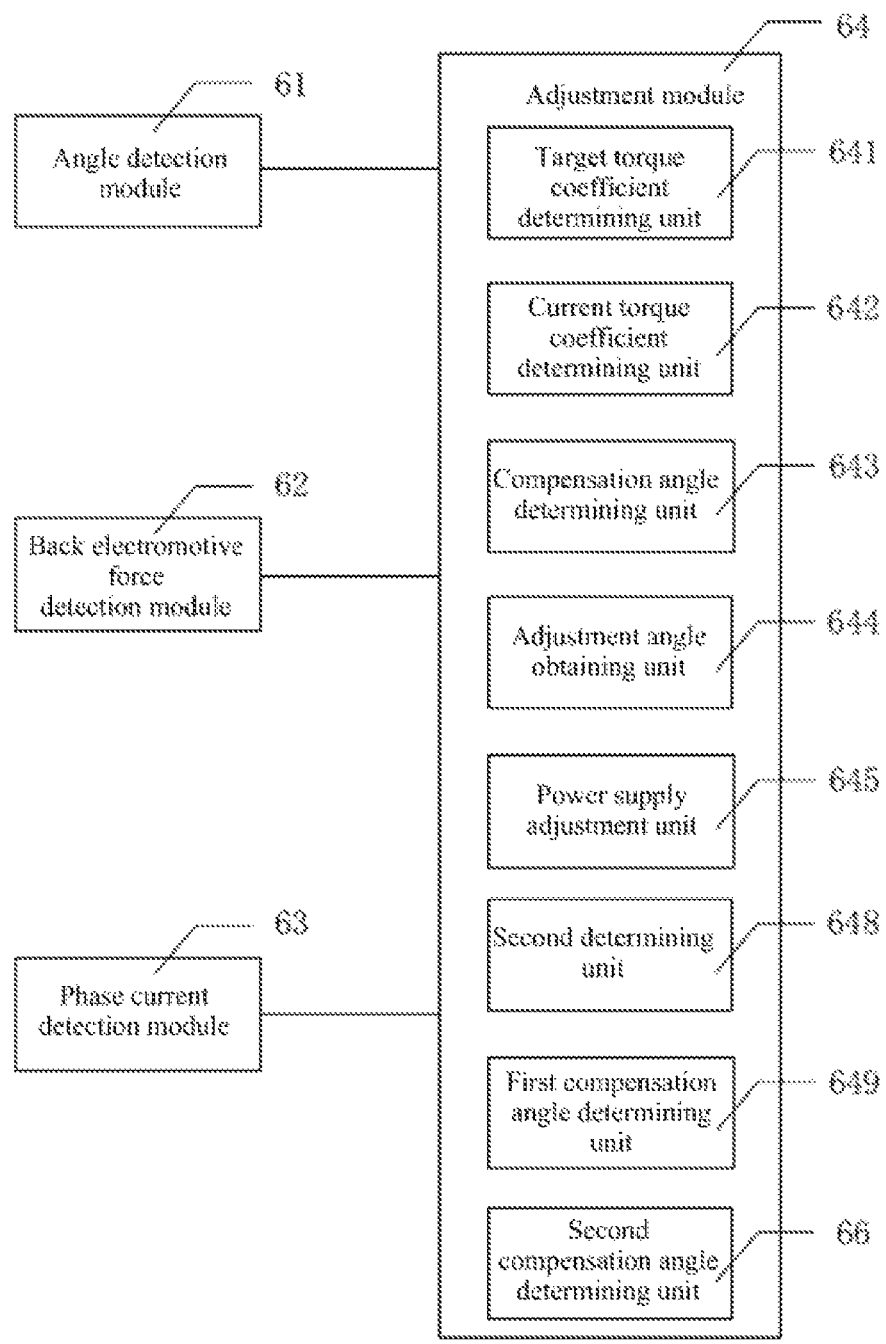
FIG. 7 is a diagram of another optimized composition structure of a motor driving apparatus according to an embodiment of the present invention.

FIG. 7 shows another optimized composition structure of a motor driving apparatus according to an embodiment of the present invention. For ease of description, only a part related to this embodiment of the present invention is illustrated.

For a specific implementation manner of this embodiment of the present invention, refer to FIG. 7. The compensation angle determining unit 643 specifically includes a second determining unit 648, a first compensation angle determining unit 649, and a second compensation angle determining unit 66.

The second determining unit 648 is configured to determine whether a difference between the current torque coefficient and the target torque coefficient is within a second error range.

The first compensation angle determining unit 649 is configured to: if the difference is outside the second error range, determine the compensation angle $\theta_i$ by using a first rotor angle compensation model, where the first rotor angle compensation model is $\theta_i = 2^i \times \Delta$, $\theta_i$ is an angle for the $i^{th}$ compensation, i is greater than 1, and $\Delta$ is a unit angle.

The second compensation angle determining unit 66 is configured to: if the difference is within the second error range, determine the compensation angle $\theta_i$ by using a second rotor angle compensation model, where the second rotor angle compensation model is $\theta_i = 1/2 \times (|\theta_{i-1} - \theta_{i-2}|)$, $\theta_i$ is an angle for the $i^{th}$ compensation, $\theta_{i-1}$ is an angle for the $(i-1)^{th}$ compensation, and $\theta_{i-2}$ is an angle for the $(i-2)^{th}$ compensation.

A person skilled in the art may understand that units included in the motor driving apparatus provided in the embodiments of the present invention are merely divided by functional logic, and the foregoing division is not a limitation, provided that corresponding functions can be implemented. In addition, specific names of all functional units are merely for distinguishing between each other, but are not used to limit the protection scope of the present invention.

The embodiments of the present invention further provide a motor-based electric appliance, where the electric appliance includes the foregoing motor driving apparatus and motor.

The foregoing content is further specific description of the present invention with reference to detailed preferred implementation manners, and the description should not be regarded as any limitation to detailed implementation of the present invention. For a person of ordinary skill in the art to which the present invention belongs, any equivalent replacement or apparent variant, which is made without departing from the concept of the present invention or changing performance or functionality, should be included within the patent protection scope determined by the submitted claims in the present invention.

The invention claimed is:

1. A motor driving method, wherein the motor driving method comprises:

when a rotor of a motor rotates, detecting a current angle of the rotor at a current moment by using a Hall sensor, detecting a back electromotive force of the motor at the current moment, and detecting a phase current of the motor at the current moment;

determining a target torque coefficient by using a relational model for a back electromotive force and a torque coefficient according to the back electromotive force;

determining a current torque coefficient by using a relational model for a phase current and a torque coefficient according to the detected phase current;

and determining a compensation angle according to a rotor angle compensation model if a difference between the current torque coefficient and the target torque coefficient is outside a first error range; and compensating the current angle by using the compensation angle, to obtain an adjustment angle; and adjusting power supply to the motor according to the adjustment angle by using a field orientation technology.

2. The motor driving method according to claim 1, wherein the motor driving method further comprises:

when the rotor of the motor rotates, detecting a rotational speed of the rotor at the current moment by using the Hall sensor; and the step of determining a target torque coefficient by using a relational model for a back electromotive force and a torque coefficient according to the back electromotive force is specifically:

determining the target torque coefficient according to the back electromotive force and the rotational speed by using a first torque coefficient model; wherein the first torque coefficient model is $$K_T = \frac{3}{2} \times \frac{E}{n} \times \frac{60}{2\pi},$$

wherein $K_T$ is the target torque coefficient, E is a peak value of the back electromotive force, and n is the rotational speed of the rotor.

3. The motor driving method according to claim 1, wherein the relational model for a phase current and a torque coefficient is $$K'_T = \frac{T}{I},$$

$K'_T$ is the current torque coefficient, T is a preloaded load torque, and I is a peak value of the phase current of the motor.

4. The motor driving method according to claim 3, wherein the step of determining a compensation angle according to a rotor angle compensation model if a difference between the current torque coefficient and the target torque coefficient is outside a first error range comprises:

determining whether the current torque coefficient and the target torque coefficient meet a torque coefficient error model, wherein the torque coefficient error model is $$\left| \frac{K'_T - K_T}{K_T} \right| \leq \varepsilon,$$

and $\varepsilon$ is determined according to the first error range; and if the current torque coefficient and the target torque coefficient meet the torque coefficient error model, using the current angle as the adjustment angle; or if the current torque coefficient and the target torque coefficient do not meet the torque coefficient error model, determining the compensation angle according to the rotor angle compensation model.

5. The motor driving method according to claim 1, wherein the step of determining a compensation angle according to a rotor angle compensation model specifically comprises:
  determining whether a difference between the current torque coefficient and the target torque coefficient is within a second error range; and
  if the difference is outside the second error range, determining the compensation angle $\theta_i$ by using a first rotor angle compensation model, wherein the first rotor angle compensation model is $\theta_i = 2^i \times \Delta$, $\theta_i$ is an angle for the $i^{th}$ compensation, i is greater than 1, and $\Delta$ is a unit angle; or
  if the difference is within the second error range, determining the compensation angle $\theta_i$ by using a second rotor angle compensation model, wherein the second rotor angle compensation model is $\theta_i = 1/2 \times (|\theta_{i-1} - \theta_{i-2}|)$, $\theta_i$ is an angle for the $i^{th}$ compensation, $\theta_{i-1}$ is an angle for the $(i-1)^{th}$ compensation, and $\theta_{i-2}$ is an angle for the $(i-2)^{th}$ compensation.

6. A motor driving apparatus, wherein the motor driving apparatus comprises an angle detection module, a back electromotive force detection module, a phase current detection module, and an adjustment module; wherein
  the angle detection module is configured to: when a rotor of a motor rotates, detect a current angle of the rotor at a current moment by using a Hall sensor;
  the back electromotive force detection module is configured to: when the rotor of the motor rotates, detect a back electromotive force of the motor at the current moment;
  the phase current detection module is configured to: when the rotor of the motor rotates, detect a phase current of the motor at the current moment;
  the adjustment module comprises a target torque coefficient determining unit, a current torque coefficient determining unit, a compensation angle determining unit, an adjustment angle obtaining unit, and a power supply adjustment unit;
  the target torque coefficient determining unit is configured to determine a target torque coefficient by using a relational model for a back electromotive force and a torque coefficient according to the back electromotive force detected by the back electromotive force detection module;
  the current torque coefficient determining unit is configured to determine a current torque coefficient by using a relational model for a phase current and a torque coefficient according to the phase current detected by the phase current detection module;
  the compensation angle determining unit is configured to determine a compensation angle according to a rotor angle compensation model if a difference between the current torque coefficient and the target torque coefficient is outside a first error range;
  the adjustment angle obtaining unit is configured to compensate, by using the compensation angle, the current angle detected by the angle detection module, to obtain an adjustment angle; and
  the power supply adjustment unit is configured to adjust power supply to the motor according to the adjustment angle by using a field orientation technology.

7. The motor driving apparatus according to claim 6, wherein the motor driving apparatus comprises a rotational speed detection module; wherein
  the rotational speed detection module is configured to: when the rotor of the motor rotates, detect a rotational speed of the rotor at the current moment by using the Hall sensor;
  the target torque coefficient determining unit is specifically configured to determine the target torque coefficient by using a first torque coefficient model according to the back electromotive force detected by the back electromotive force detection module and the rotational speed detected by the rotational speed detection module; wherein
  the first torque coefficient model is $$K_T = \frac{3}{2} \times \frac{E}{n} \times \frac{60}{2\pi},$$

wherein $K_T$ is the target torque coefficient, E is a peak value of the back electromotive force, and n is the rotational speed of the rotor.

8. The motor driving apparatus according to claim 7, wherein the relational model for a phase current and a torque coefficient is $$K'_T = \frac{T}{I},$$

$K'_T$ is the current torque coefficient, T is a predetected or calculated load torque, and I is a peak value of the phase current of the motor.

9. The motor driving apparatus according to claim 8, wherein the adjustment module further comprises a first determining unit and an acting unit; wherein
  the first determining unit is configured to determine whether the current torque coefficient and the target torque coefficient meet a torque coefficient error model, wherein the torque coefficient error model is $$\left| \frac{K'_T - K_T}{K_T} \right| \leq \varepsilon,$$

and $\varepsilon$ is determined according to the first error range;
  the acting unit is configured to: if the current torque coefficient and the target torque coefficient meet the torque coefficient error model, use the current angle as the adjustment angle; and
  the compensation angle determining unit is specifically configured to: if the current torque coefficient and the target torque coefficient do not meet the torque coefficient error model, determine the compensation angle according to the rotor angle compensation model.

10. A motor-based electric appliance, wherein the electric appliance comprises the motor and the motor driving apparatus according to claim 7.

11. The motor driving apparatus according to claim 6, wherein the compensation angle determining unit specifically comprises a second determining unit, a first compensation angle determining unit, and a second compensation angle determining unit; wherein
  the second determining unit is configured to determine whether a difference between the current torque coefficient and the target torque coefficient is within a second error range;

the first compensation angle determining unit is configured to: if the difference is outside the second error range, determine the compensation angle $\theta_i$ by using a first rotor angle compensation model, wherein the first rotor angle compensation model is $\theta_i = 2^i \times \Delta$, $\theta_i$ is an angle for the $i^{th}$ compensation, i is greater than 1, and $\Delta$ is a unit angle; and the second compensation angle determining unit is configured to: if the difference is within the second error range, determine the compensation angle $\theta_i$ by using a second rotor angle compensation model, wherein the second rotor angle compensation model is $\theta_i = 1/2 \times (|\theta_{i-1} - \theta_{i-2}|)$, $\theta_i$ is an angle for the $i^{th}$ compensation, $\theta_{i-1}$ is an angle for the $(i-1)^{th}$ compensation, and $\theta_{i-2}$ is an angle for the $(i-2)^{th}$ compensation.

* * * * *